Jan. 10, 1950     T. K. LÜTOLF     2,493,886
BEARING ARRANGEMENT FOR ROTATABLY
SUPPORTED, SHELL-SHAPED BODIES
Filed Sept. 14, 1946
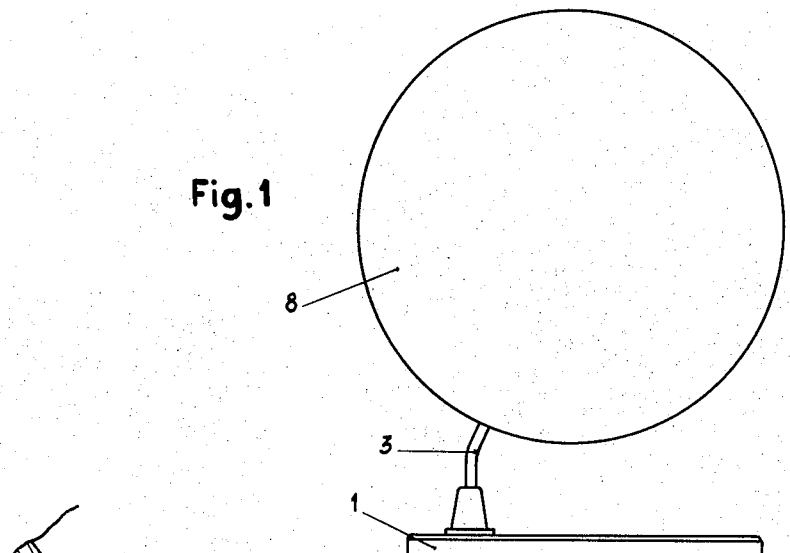
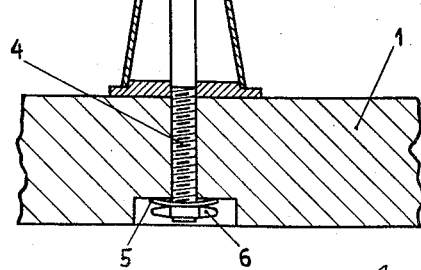
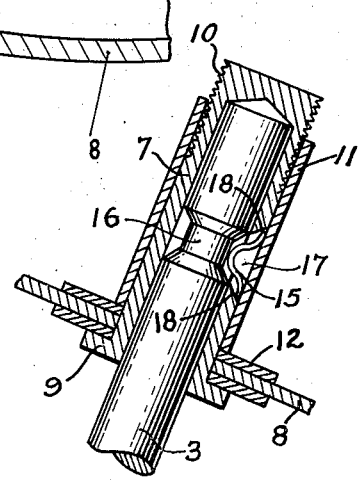
Inventor:
Theo K. Lütolf,
by Singer, Ehlert, Stern & Carlberg,
Attorneys.

Patented Jan. 10, 1950

2,493,886

UNITED STATES PATENT OFFICE 2,493,886

BEARING ARRANGEMENT FOR ROTATABLY SUPPORTED SHELL-SHAPED BODIES

Theo K. Lütolf, Zurich, Switzerland

Application September 14, 1946, Serial No. 697,025
In Switzerland January 9, 1946

4 Claims. (Cl. 308—139)

The present invention relates to a bearing arrangement for rotatably supported, shell-shaped bodies for instance, terrestrial globes.

In the drawing:

Fig. 1 illustrates an elevational view of a terrestrial globe rotatably mounted on a bearing pin extending upwardly from a supporting base, Fig. 2 illustrates in an enlarged sectional view the construction of the bearing and the mounting the bearing pin in the supporting base, and Fig. 3 illustrates in a detailed sectional view the locking device in the bearing arrangement which yieldingly resists a removal of the globe.

The accompanying drawing shows a partial cross-section through the object of the invention and also a view of the whole object (Fig. 1). In the drawing the rectangular baseplate 1 has fixed vertically in it a bearing axle 2, which is bent obliquely at 3. The axle 2 is secured in the baseplate 1 by means of a screw-thread 4, washer 5 and nut 6. On the upper end of the axle 2 is a sleeve 7, which passes through the shell-shaped body 8 and is provided outside the shell with a collar 9 and inside the shell with an external thread 10. Round the sleeve 7 a second sleeve 11 is arranged, which rests with its flange 12 on the inner side of the shell 8 and which is pressed against the said inner side by the nut 13 screwed on to the thread 10. A cone-shaped socket 14 supports both the sleeve 11 and the body 8 with a respect to each other. The sleeve 11 is provided between its ends with a slot 17 having inclined end walls 18 supporting the ends of a bow-shaped spring 15 which, with the parts in the position illustrated, enters with the curved center portion into an annular groove 16 provided in the bearing pin portion 3. This arrangement provides a faultless and secure bearing for the shell-shaped body.

The arrangement illustrated has the advantage that the shell-shaped body 8 may readily be removed from the axle 2 and placed on it again. When removing the shell-shaped body the spring 15 is pressed outwards, against the sleeve 11, whilst when the body 8 is replaced, the spring, in consequence of its elasticity, automatically enters the annular groove 16. Thus little room is required over the baseplate 1, and it is not necessary to provide the usual meridian. The whole body 8 may be viewed externally without any hindrance.

As already mentioned, the described bearing arrangement is especially suitable for terrestrial globes, which are composed, for instance, in the known manner of an inner layer of cardboard and an outer layer of gypsum. In that case the upper part of the axle 2 is bent over at an angle of 67° to the baseplate. The globes are made of two hemispheres which are stuck together. The described arrangement has the advantage of being simple, inexpensive and easily viewed.

Instead of the axle being fixed perpendicular to the baseplate 1 as illustrated, it could also be inserted obliquely into the baseplate.

I claim:

1. A bearing arrangement for rotatably supported shell-shaped bodies, such as globes, comprising a sleeve extending into the shell-shaped body and having at one end a flange engaging the outer surface of said body and having on its other end which is positioned within said body an exterior thread on which a nut is mounted, a second sleeve positioned on said first named sleeve and having a flange on one end engaging the inner surface of said body, and being clamped thereagainst by said nut on said first named sleeve, and a supporting base having an upwardly projecting bearing pin the upper end of which extends into said first named sleeve to rotatably support said shell-shaped body.

2. A bearing arrangement for rotatably supported shell-shaped bodies, such as globes, comprising a sleeve extending into the shell-shaped body and having at one end a flange engaging the outer surface of said body and having on its other end, which is positioned within said body, an exterior thread on which a nut is mounted, a second sleeve positioned on said first named sleeve and having a flange on one end engaging the inner surface of said body, and being clamped thereagainst by said nut on said first named sleeve, a supporting base having an upwardly projecting bearing pin the upper end of which extends into said first named sleeve to rotatably support said shell-shaped body, and means including a spring between said bearing pin and said first named sleeve for preventing accidental removal of said shell-shaped body from said bearing pin.

3. A bearing arrangement for rotatably supported shell-shaped bodies, such as globes, comprising a sleeve extending into the shell-shaped body and having at one end a flange engaging the outer surface of said body and having on its other end, which is positioned within said body, an exterior thread on which a nut is mounted, a second sleeve positioned on said first named sleeve and having a flange on one end engaging the inner surface of said body, and being clamped thereagainst by said nut on said first named sleeve, a curved leaf spring mounted in a slot provided in said first named sleeve between the ends thereof, the ends of said leaf spring resting against end walls of said slot while the curved center portion of said spring projects into the bore of said first named sleeve, and a supporting base having an upwardly projecting bearing pin with an annular groove spaced from its upper end, the curved center portion of said leaf spring extending into said groove for yieldingly resisting removal of said shell-shaped body from said bearing pin.

4. A bearing arrangement for rotatably supported shell-shaped bodies, such as globes, comprising a sleeve extending into the shell-shaped body and having at one end a flange engaging the outer surface of said body and having on its other end, which is positioned within said body, an exterior thread on which a nut is mounted, a second sleeve positioned on said first named sleeve and having a flange on one end engaging the inner surface of said body, a conically shaped socket member arranged concentrically about said two sleeves and resting with its larger diameter against the inner face of said shell-shaped body and with its smaller diameter against said nut, the latter urging said second sleeve and said conically shaped socket member in frictional clamping engagement with the inner face of said shell-shaped body, and a supporting base having an upwardly projecting bearing pin the upper end of which extends into said first named sleeve to rotatably support said shell-shaped body.

THEO K. LÜTOLF.

REFERENCES CITED

The following references are of record in the file of this patent:

UNITED STATES PATENTS

| Number | Name | Date |
|---|---|---|
| 519,061 | Hodgson | May 1, 1894 |
| 648,117 | Stubblefield | Apr. 24, 1900 |
| 968,327 | Christianson | Aug. 23, 1910 |
| 2,343,173 | Dupler | Feb. 29, 1944 |